(12) United States Patent
Altenhofen et al.

(10) Patent No.: US 7,984,188 B2
(45) Date of Patent: Jul. 19, 2011

(54) SYSTEM AND A METHOD FOR MEDIATING WITHIN A NETWORK

(75) Inventors: Michael Altenhofen, Karlsruhe (DE); Egon Boerger, Calci (IT); Jens Lemcke, Karlsruhe (DE)

(73) Assignee: SAP AG, Walldorf (DE)

( * ) Notice: Subject to any disclaimer, the term of this patent is extended or adjusted under 35 U.S.C. 154(b) by 1286 days.

(21) Appl. No.: 11/405,363

(22) Filed: Apr. 17, 2006

(65) Prior Publication Data
US 2006/0259605 A1    Nov. 16, 2006

(30) Foreign Application Priority Data

Apr. 19, 2005 (EP) .................................... 05008517

(51) Int. Cl.
*G06F 15/16* (2006.01)
(52) U.S. Cl. ........ 709/246; 709/201; 709/202; 709/249; 717/102; 719/313; 719/315; 719/317; 719/328
(58) Field of Classification Search .................. 709/223, 709/225, 226, 224, 201, 202, 203, 246, 249; 717/102, 111; 719/310, 313, 315, 317, 328, 719/311, 314, 330
See application file for complete search history.

(56) References Cited

U.S. PATENT DOCUMENTS

| | | | | |
|---|---|---|---|---|
| 5,915,113 A | * | 6/1999 | McDonald et al. | 717/109 |
| 6,012,083 A | * | 1/2000 | Savitzky et al. | 709/202 |
| 6,067,559 A | * | 5/2000 | Allard et al. | 709/202 |
| 6,076,952 A | * | 6/2000 | Gretta et al. | 700/83 |
| 6,088,028 A | * | 7/2000 | Gipalo | 715/748 |
| 6,112,225 A | * | 8/2000 | Kraft et al. | 709/202 |
| 6,253,369 B1 | * | 6/2001 | Cloud et al. | 717/136 |
| 6,256,676 B1 | * | 7/2001 | Taylor et al. | 709/246 |
| 6,308,178 B1 | * | 10/2001 | Chang et al. | 1/1 |
| 6,691,151 B1 | * | 2/2004 | Cheyer et al. | 709/202 |

(Continued)

FOREIGN PATENT DOCUMENTS

EP    1016989 A2    7/2000

OTHER PUBLICATIONS

Barros et al.; "A Critical Overview of the Web Services Choreography Description Language (WS-CDL)"; Mar. 2005; www.bptrends.com.*

(Continued)

*Primary Examiner* — Salad Abdullahi
*Assistant Examiner* — Jimmy H Tran
(74) *Attorney, Agent, or Firm* — Brake Hughes Bellermann LLP (57) ABSTRACT

A mediator system (and associated methods and computer program products) for mediating a communication between a client and a plurality of providers within a network is described. The mediator system may include logical machines including a first receiving machine configured to receive a request message from the client, a first sending machine configured to send answer messages back to the client, a processing machine configured to handle the received request message internally represented as a request object, a second sending machine configured to send outgoing request messages to the providers, and a second receiving machine configured to receive incoming answer messages from the providers. The machines can be scheduled separately from being executed, and the request object may be split into subrequests, where each of those subrequests may be further decomposed into subsubrequests that may be sent out in parallel to the providers.

28 Claims, 4 Drawing Sheets

U.S. PATENT DOCUMENTS

| | | | |
|---|---|---|---|
| 6,708,213 B1* | 3/2004 | Bommaiah et al. | 709/226 |
| 6,738,975 B1* | 5/2004 | Yee et al. | 719/310 |
| 6,769,121 B1* | 7/2004 | Koyama et al. | 718/100 |
| 6,781,607 B1* | 8/2004 | Benham | 715/744 |
| 6,801,943 B1* | 10/2004 | Pavan et al. | 709/226 |
| 6,859,212 B2* | 2/2005 | Kumar et al. | 715/744 |
| 6,909,691 B1* | 6/2005 | Goyal et al. | 370/230 |
| 6,950,860 B1* | 9/2005 | Farah et al. | 709/218 |
| 6,961,926 B2* | 11/2005 | Koyama | 717/129 |
| 7,096,267 B2* | 8/2006 | Lansio et al. | 709/227 |
| 7,243,120 B2* | 7/2007 | Massey | 709/200 |
| 7,383,355 B1* | 6/2008 | Berkman et al. | 709/246 |
| 7,386,857 B2* | 6/2008 | Das | 719/313 |
| 7,421,709 B2* | 9/2008 | Watson et al. | 719/320 |
| 7,617,500 B2* | 11/2009 | Astl et al. | 719/311 |
| 2001/0047427 A1* | 11/2001 | Lansio et al. | 709/238 |
| 2002/0026630 A1* | 2/2002 | Schmidt et al. | 717/103 |
| 2002/0057290 A1* | 5/2002 | Wilkinson et al. | 345/744 |
| 2002/0196276 A1* | 12/2002 | Corl et al. | 345/744 |
| 2003/0004744 A1* | 1/2003 | Greene et al. | 705/1 |
| 2003/0093402 A1* | 5/2003 | Upton | 707/1 |
| 2003/0093470 A1* | 5/2003 | Upton | 709/203 |
| 2003/0105884 A1* | 6/2003 | Upton | 709/318 |
| 2004/0064503 A1* | 4/2004 | Karakashian et al. | 709/203 |
| 2004/0230659 A1* | 11/2004 | Chase | 709/206 |
| 2005/0038886 A1* | 2/2005 | Garg | 709/224 |
| 2005/0066284 A1* | 3/2005 | Ho et al. | 715/762 |
| 2005/0097450 A1* | 5/2005 | Lumera et al. | 715/511 |
| 2005/0099995 A1* | 5/2005 | Blossom et al. | 370/352 |
| 2005/0203892 A1* | 9/2005 | Wesley et al. | 707/3 |
| 2008/0275981 A1* | 11/2008 | Inagaki et al. | 709/224 |

OTHER PUBLICATIONS

Barros, Alistair, "A Critical Overview of the Web Services Choreography Description Language (WS-CDL)", *BPTrends*, (Mar. 2005),1-24.

Boerger, Egon, "The Abstract State Machines Method for High-Level System Design & Analysis", *Dipartimento di Informatica, Universita di Pisa*; http://www.di.unipi.it/~boerger.

Stark, Robert F., "Abstract State Machines: A Method for High-Level System Design and Analysis", *Computer Science Department, ETH Zurich*, http://www.inf.ethz.ch/Å?staerk, (2004), 1-13.

* cited by examiner

SYSTEM AND A METHOD FOR MEDIATING WITHIN A NETWORK

CROSS-REFERENCE TO RELATED APPLICATION

This application claims priority under 35 U.S.C. §119 to European Patent Application EP 05 008 517.4, filed Apr. 19, 2005, titled "A SYSTEM AND A METHOD FOR MEDIATING WITHIN A NETWORK," which is incorporated herein by reference in its entirety.

TECHNICAL FIELD

The present description relates generally to the field of message-based interactions between partners having different notions on how these interactions should happen. More particularly the present description refers to a system and a method to mediate and manage a communication between those partners.

BACKGROUND

Message-based interactions in Enterprise Application Integration (EAI) or BusinesstoBusiness (B2B) scenarios introduce a new level of complexity, especially if the partners involved in those scenarios have different notions on how these interactions should happen. Heterogeneity not only occurs at the data level, which means that the partners use different message formats, but also on the protocol/process level, which means that an expected number and a flow of messages within an interaction step may also differ between the partners involved. It is possible for example that one partner may always expect a confirmation for messages it has sent out to other entities whereas those entities do not necessarily acknowledge all received messages. Furthermore, it is possible that a receiving partner may expect information to be sent in pieces, i.e., in several messages, whereas a sending partner will provide all necessary information within a single message and expect a single answer.

SUMMARY

According to one general aspect, a system for mediating a communication between a client and a plurality of providers within a network is provided, wherein the client provides at least one request message. The mediator system comprises at least five predefined and callable logical machines. A first receiving machine is configured to receive the request message from the client and to create therefrom a request object. A first sending machine is configured to send answer messages back to the client. A processing machine can handle the received request message internally represented as the request object. A second sending machine is able to send outgoing request messages to the providers and a second receiving machine is configured to receive incoming answer messages from the providers. All those callable machines can be scheduled with respect to an internal request object status separately from being executed such that the request object can be split into a sequence of subrequests where each of those subrequests can be further decomposed in a set of subsubrequests that can be sent out in parallel to the providers where they can be elaborated independently of each other. The mediator system models a suitable provider interface of a strategy pattern assigned to an interface of the client. That means that the mediator system can be viewed as one implementation of a specific strategy pattern assigned to the client's interface. The mediator system provides a scheme which can be instantiated for a particular communication case.

In a possible embodiment the first and second receiving machines are realized by and implemented as one receiving machine. It is further possible to combine the first and second sending machines in one single sending machine.

The mediator system corresponds to an interface or a so-called virtual provider (VP) which is defined by the composition of the mentioned five machines. Those machines can be described or realized by so-called abstract state machines (ASM). ASMs may include a rigorous, semantically well-founded form of pseudo-code transforming arbitrary data structures, which are understood as sets of whatever objects with whatever functions and relations defined on them. Within the claimed virtual provider which is defined as a module, i.e. as a collection of defined and callable machines without a main machine that controls an execution flow, a scheduling of the machines is separated from an execution of the machines. The mediator system provides a scheme which defines and lays down rules regarding how to handle and settle an incoming request from the client.

In one example embodiment of the mediator system, the client may be characterized by handling a request message in a unified manner via a fixed well-defined interface. An interface may correspond here to the collectivity of request messages and answer messages which relate to one and the same request. A fixed interface indicates or signals that the client has an established client specific notion on how a communication should happen. This refers for example to the number and sequence of expected answers in reaction to the client's request. It is possible that such a request message originating from the client requires a plurality of providers each having to be provided by an appropriate request message. In such an example scenario, the mediator system may be interposed in order to mediate the communication between the client and the plurality of providers. The mediator system may facilitate the communication between the client and the plurality of providers, for example, by providing an appropriate transformation scheme.

In another possible embodiment of the mediator system, the first receiving machine can create from the incoming request message from the client for further internal representation a so-called request object which is appropriately initialized by recording in an internal representation a request identity (ID) and request relevant parameters. An internal representation stands for a representation which is specific and valid for any handling within the mediator system. An interaction between the client and the mediator system which is triggered by an arrival of the client's request message via a message passing system is characterized by creating at the mediator system such a request object r. The creation of the request object r further includes decorating that request object r by an appropriate status status(r) and by other useful information. These status variables as well as the information variables are automatically updated during execution of the machines.

It is possible that the predefined and callable machines can be activated depending on settings of the status variable. That means that the status variable status(r) of the request object r signals to a specific machine of the mediator system its readiness for being handled by this machine. An incoming new request object r is decorated for example by a status "status (r):=started" to signal to the processing machine its readiness for being processed.

An interaction between the mediator system and the client may include sending back an answer message providing an answer to the previous request message of the client. This answer may be sent by the mediator system, when the underlying request object r has reached through further processing a status "status(r):=deliver". This status may be triggered by a call to the first sending machine with a corresponding parameter indicating that an answer message can be delivered. This call has been internally prepared by the processing machine.

In another example embodiment of the mediator system(s) described herein, the mediator system comprises a recording machine configured to record information about or related to the received request message which can be recognized and retrieved at a later stage. The mediator system may be equipped with a unit for recording information on previously received requests to be recognized when for such a request at a later stage some additional service is requested. This includes the possibility of recognizing an incoming request as not being a NewRequest and therefore as additional request to a previously received request.

Furthermore, it is possible that the mediator system comprises a scheduler which can call and therewith activate one of the machines which is ready to execute. It is possible that the scheduler can dynamically schedule an execution order of the machines when a plurality of request messages is provided from one or more clients.

In another example embodiment it is possible that the scheduler includes an interleaving scheduler which may possibly non-deterministically call and therewith activate one of the machines which is ready to execute.

The request object may be split as already indicated into a sequence of subrequests where each of those subrequests can be further decomposed in a set of outgoing request messages, which can be called subsubrequests. Those subsubrequests can be sent out in parallel to external providers where they can be elaborated independently of each other. That means that an incoming request object triggers a sequential elaboration of a finite number of immediate subrequests, called for short in the following sequential subrequests. Each such sequential subrequest can trigger a finite number of further subsubrequests, which can be sent to external providers in parallel, thus describable as parallel subrequests of the corresponding sequential subrequest.

It is also possible that at least a part of the subrequests can be at least partially serviced internally by the processing machine. In such a case the processing machine itself acts as a provider. It is possible that the processing machine retrieves recorded information in order to service a subrequest or a subsubrequest internally without sending out an appropriate outgoing request message to an external provider.

Furthermore, it is possible that the outgoing request messages can each be sent to and processed by different providers which are independent of each other.

In still a further possible embodiment of the mediator system(s) described herein, the processing machine may comprise an iterator submachine which is configured to elaborate the sequential subrequests.

In a further example embodiment of the mediator system the answer message to be sent back to the client can be automatically compiled and transformed into a client compatible format.

It is also possible that the mediator system includes a composition of a number of sub mediator systems which are appropriately connected with each other via corresponding interfaces.

It is possible that the first and second sending machines are configured to do any actual sending and relate to the communication medium used by the client and the providers, respectively. This can also apply to the first and second receiving machines.

According to another general aspect, a method for mediating a communication between a client and a plurality of providers within a network is described, wherein the client provides at least one request message with request relevant parameters. The method comprises at least receiving the request message from the client, creating from the request message a request object, splitting the request object with respect to the request relevant parameters into a sequence of subrequests, processing the request of the request message with respect to the sequence of subrequests, sending request specific outgoing request messages to the providers, receiving incoming answers with respect to the outgoing request messages from the providers, processing the incoming answer messages and of sending an answer message back to the client, wherein the steps of sending outgoing requests, receiving incoming answers and processing the incoming answers are dynamically scheduled and executed as many times as needed for completion or settlement of the sequence of subrequests. Some of the above operation, e.g., sending an answer message back to the client, may be optional.

The method(s) can be performed by a mediator system as described herein. Receiving request messages from clients can therefore be performed by a first receiving machine, in the following called RECEIVEREQ. The received request messages become elements of a set in the following called InReqMssg. The step of sending answer messages which become elements of a set in the following called OutAnswerMssg back to clients can be performed by a first sending machine in the following called SENDANSW. The received requests which are so-called request objects and therefore elements of a set in the following called ReqObj are handled by a processing machine. The handling of a request object can typically be done by sending to at least one provider or to several providers request messages for a series of subrequests which are needed to service the currently handled request. The currently handled request can be called currReqObj. The outgoing request messages which are elements of a so-called set OutReqMssg to at least one or to several providers is done by a second sending machine in the following called SENDREQ. The providers can again be virtual providers. The incoming answer messages from the providers which are elements of a set, in the following called InAnswMssg are received by a second receiving machine called RECEIVEANSW. Therefore, the claimed system for mediating can be described as follows:

MODULE VIRTUALPROVIDER=
RECEIVEREQ
SENDANSW
PROCESS
SENDREQ
RECEIVEANSW

In an example embodiment of the method(s) as described herein a scheduler is provided which can call and therewith activate one of the machines which is ready to execute. The scheduler can dynamically schedule an execution order of the machines when a plurality of request messages is provided by one or more clients. Furthermore, the scheduler can be chosen as an interleaving scheduler which can possibly non-deterministically call and therewith activate one of the machines which is ready to execute. In case of a pure interleaving scheduler, it is possible to turn the system for mediation into an already mentioned abstract state machine (ASM) which at each moment non-deterministically can choose one of its submachines for execution. Such a call could have the following form:

```
VIRTUALPROVIDER=
    choose M∈ {RECEIVEREQ,SENDANSW} ∪
        {PROCESS,SENDREQ,RECEIVEANSW}
        M
```

In the following examples, by way of explanation and not limitation, the communication between the client and a plurality of providers is described by assuming that all relevant state information for every received or sent message is contained in the message.

For receiving and sending request and answer messages it can be abstracted within the scope of the present description from particularities of the concrete message passing system. For example, it may be sufficient to consider the following behavioral communication interfaces for mailboxes for incoming and outgoing messages. Those interfaces are imported predicates and machines which are specified and implemented elsewhere. A predicate called ReceivedReq is introduced which is used by RECEIVEREQ and expressing that an incoming request message which is passed as argument to the predicate has been received from some client. A further predicate called ReceivedAnsw is introduced which is used by RECEIVEANSW and expressing that an answer message to a previously sent request message which can be retrievable from the message has been received. Further the machine called SEND is introduced which is used by SENDANSW for sending out answer messages to requests back to the client where the requests originated and by SENDREQ for sending out requests to providers. In both cases the addresses may be, for example, previously known, or may be encoded into the message. For reasons of modularity the internal preparation of outgoing answer or request messages in the processing machine PROCESS is separated from the machine SEND which does the actual sending and relates to the communication medium. Therefore, the following two abstract predicates for mailboxes of outgoing mail are also introduced: (a) SentAnswToMailer expressing that an outgoing answer message elaborated from a PROCESS internal representation of an answer has been sent to the machine SEND to be actually passed to the external message passing system, and (b) SentReqToMailer expressing that an outgoing request message corresponding to an internal representation of a request has been sent to SEND to be actually passed to the external message passing system.

An interaction between the client and the mediator system which is triggered by an arrival of a client's request message (incoming request message) via a message passing system is characterized by creating at the mediator system a request object, say element r of a set ReqObj of currently alive request objects, which is appropriately initialized by recording in an internal representation the relevant data or parameters which are encoded in the received request message. This may include further decorating that object by an appropriate status. The status may be for example "started", to signal to a scheduler for the processing machine its readiness for being processed and by other useful information. This requirement for the machine called RECEIVEREQ is captured by the following definition which is parameterized by the incoming request message, an element of the above described set InReqMssg, and by the set ReqObj of current request objects of the mediator system.

For simplicity of exposition a preemptive ReceivedReq predicate is assumed. The definition can then be noted as follows:

```
RECEIVEREQ(inReqMsg,ReqObj)=
    if ReceivedReq(inReqMsg) then
        CREATENEWREQOBJ(inReqMsg,ReqObj)
    where
    CREATENEWREQOBJ(m,R)=
        let r=New(R)$^5$ in
            INITIALIZE(r,m)
```

In an example embodiment with state component the definition of RECEIVEREQ is refined by adding the case that a request is recognized as not a NewRequest, but an additional request to a previously received original request, whose state has to be updated by an additional machine REFRESHREQOBJ.

```
RECEIVEREQ(inReqMsg,ReqObj)=
    if ReceivedReq(inReqMsg) then
        if NewRequest(inReqMsg) then
            CREATENEWREQOBJ(inReqMsg,ReqObj)
        else let r=prevReq(inReqMsg) in
            REFRESHREQOBJ(r,inReqMsg)
```

The interaction between the mediator system and the client which may include sending back an answer message providing an answer to a previous request of the client may be characterized by the underlying request object having reached through further processing by the processing machine a status where a call to the first sending machine called SENDANSW with corresponding parameter outAnswMsg has been internally prepared by the processing machine called PROCESS, say by setting the above described answer-mailbox predicate SentAnswToMailer for this argument to the value "true". Thus, one can specify the first sending machine SENDANSW and symmetrically the second sending machine SENDREQ with the above described request-mailbox predicate SentReqToMailer as follows:

```
SENDANSW(outAnswerMsg,SentAnswToMailer)=
    if SentAnswToMailer(outAnswerMsg) then SEND(outAnswerMsg)
SENDREQ(outReqMsg,SentReqToMailer)=
    if SentReqToMailer(outReqMsg) then SEND(outReqMsg)
```

For the definition of the second receiving machine called RECEIVEANSW a parameter called AnswerSet can be used which provides for every request message r which may have triggered sending some subrequests to the subproviders the AnswerSet(r), where to insert an internal representation of each answer contained in the incoming answer message. This can be described as follows:

```
RECEIVEANSW(inAnswMsg,AnswerSet)=
    if ReceivedAnsw(inAnswMsg) then
        insert answer(inAnswMsg) into AnswerSet(requestor(inAnswMsg))
```

The first receiving machine which is configured to receive a request message from the client and the first sending machine which is configured to send an appropriate answer message back to the client can be linked by a so-called status function value for a current request object called as stated above currReqObj. This realizes that the considered communication interface is of a "provided behavioral interface" type as it is discussed, for example, in a document of A. Barros, M. Dumas, and P. Oaks (A critical overview of the web services choreography description language (WS-CDL). White paper, 24, Jan. 2005), where the action of the first receiving machine RECEIVEREQ corresponds to receive an incoming request through which a new request object called reqObj is created, and occurs before the corresponding first sending machine SENDANSW is called which happens after the outgoing answer message in question has reached the status "deliver". The pair of machines SENDREQ and RECEIVEANSW also realizes the symmetric required behavioral interface type where the SEND actions in SENDREQ correspond to outgoing requests and thus occur before the corresponding RECEIVEANSW actions of the incoming answers to those requests.

As already mentioned, it is possible that the mediator system with the help of which the method for mediating a communication within the network can be performed is a composition of a number of sub mediator systems which are appropriately connected with each other via corresponding interfaces. Those sub mediator systems $VP_1, \ldots, \ldots, VP_n$ of the mediator system can be configured into say a sequence, leading to a mediator system $VP_1$, which involves a sub mediator system $VP_2$, which involves its own sub mediator system $VP_3$ etc. For such a nested composition it suffices to connect the communication interfaces in an appropriate way, in the case of a sequence as follows (for example): The second sending machine SENDREQ of sub mediator system $VP_i$ is connected with the first receiving machine RECEIVEREQ of sub mediator system $VP_{i+1}$, which implies that in the message passing environment, the types of the sets of the outgoing request messages of sub mediator system $VP_i$ and the incoming request messages of $VP_{i+1}$ match via some data mediation. Furthermore, the first sending machine SENDANSW of sub mediator system $VP_{i+1}$ is connected with the second receiving machine RECEIVEANSW of sub mediator system $VP_i$, which implies that in the message passing environment, the types of the sets of the outgoing answer messages of sub mediator system $VP_{i+1}$ and the incoming answer messages of sub mediator system $VP_i$ match via some data mediation.

Such a sequential composition of the mediator systems allows to configure mediator systems which provide a possibility of unfolding arbitrary alternating sequential subrequest/parallel subrequest trees, where at each level one has sequential subrequests each of which branches into a subtree of parallel subsubrequests, each of which may have a subtree of other sequential subrequests, etc. It is obvious that for mediator systems even more complex composition schemes can be defined if necessary.

Embodiments may be implemented, for example, in a computer program product with a computer-readable medium and/or a computer program stored on the computer-readable medium with a program code that is suitable for carrying out method(s) described herein, as well as additional or alternative methods, as would be apparent. The computer program also may be provided with a program code is suitable for carrying out method(s) described herein. Example embodiments may be implemented using a computer-readable medium with a computer program stored thereon, the computer program comprising a program code, which is suitable for carrying out method(s) as described herein, as well as additional or alternative methods, as would be apparent.

Further features and embodiments will become apparent from the description and the accompanying drawings. It will be understood that the features mentioned above and those described hereinafter can be used not only in the combination specified but also in other combinations or on their own.

The drawings illustrate various example embodiments, and the present description is explained in detail with reference to the drawings. It is understood, however, that the description is in no way limiting, and merely provides an illustration(s) of possible embodiments.

Further, it should be understood that while a specific system(s) is described, applications exist in/for a variety of communication systems, such as, for example, advanced cable-television systems, advanced telephone networks or any other communication system that would benefit from the system(s) or the method(s) described herein, or additional or alternative methods. Thus, the system(s) as described herein, as well as appropriate additions or alternative thereto, may be used in virtually any appropriate communication system.

The details of one or more implementations are set forth in the accompanying drawings and the description below. Other features will be apparent from the description and drawings, and from the claims.

DETAILED DESCRIPTION

Figure 1:
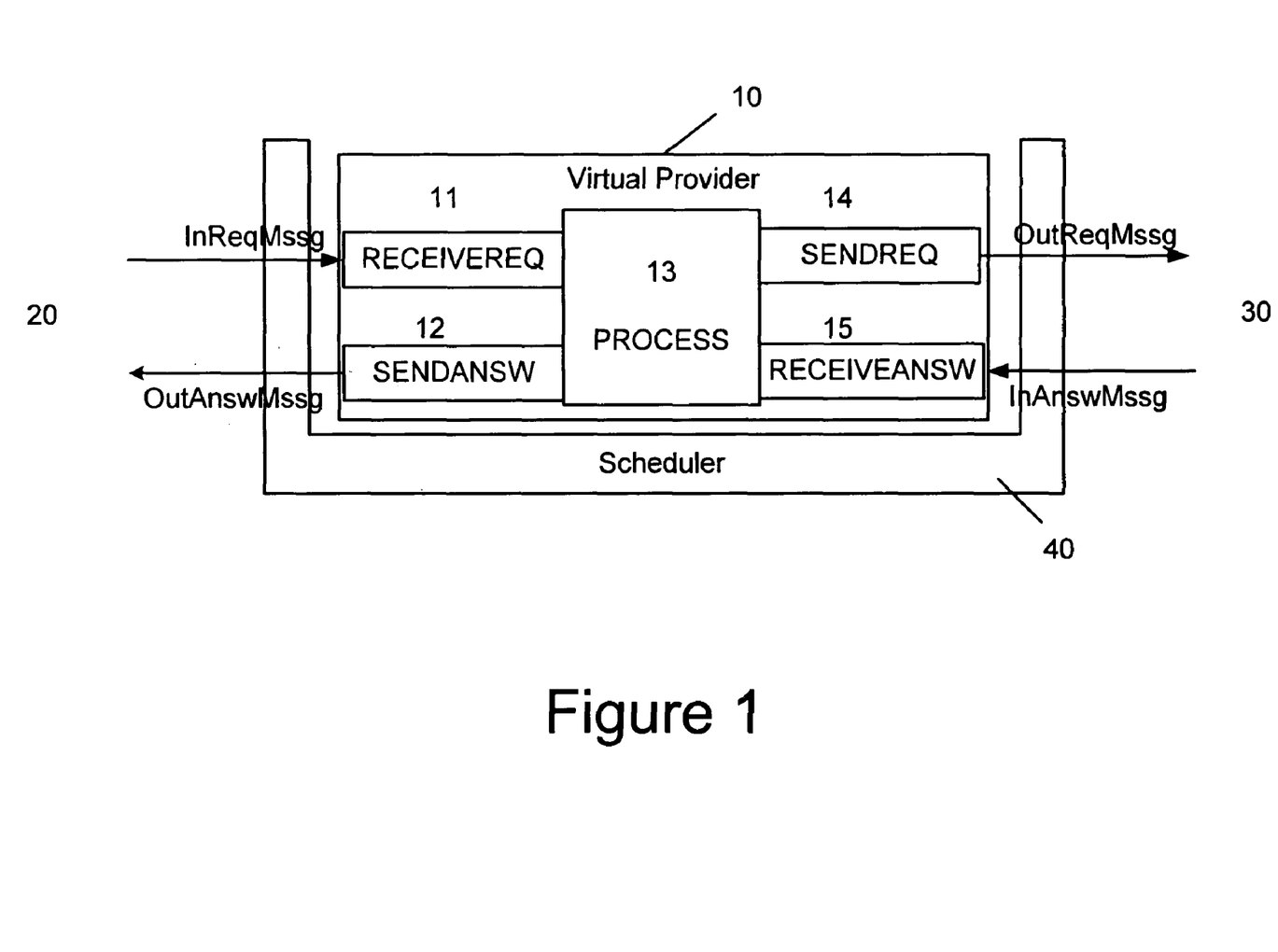
FIG. 1 shows a schematic diagram of an embodiment of a system for mediating within a network.

FIG. 1 shows a mediator system 10 for mediating a communication between a client 20 and a plurality of providers 30 within a network. The mediator system 10 comprises five predefined and callable machines. A first receiving machine 11 is configured to receive request messages from the client 20. A first sending machine 12 is configured to send answer messages back to the client 20. A processing machine 13 is able to handle received request messages. A second sending machine 14 can be used to send outgoing request messages to the providers 30 and a second receiving machine 15 is configured to receive incoming answer messages from the providers 30. All those machines are described here as abstract state machines (ASM).

In a formal or mathematical description of the mediator system which can also be described as a virtual provider the mentioned machines can be described, as already mentioned, by specific type names. The first receiving machine 11 can be called RECEIVEREQ, the first sending machine 12 SENDANSW, the processing answer 13 PROCESS, the second sending machine 14 SENDREQ and the second receiving machine 15 RECEIVEANSW. With the help of those formal descriptions, the mediator system can also be formally described as follows:

MODULE VIRTUALPROVIDER=
RECEIVEREQ
SENDANSW
PROCESS
SENDREQ
RECEIVEANSW

FIG. 1 further points to a scheduler 40. The scheduling of the machines is separated from the execution of the machines. It is possible to express the scheduler as a pure interleaving scheduler. Therefore, it is possible to turn the scheduler 40 into an abstract state machine. In this case all the other machines 11, 12, 13, 14 and 15 can be regarded as submachines of the interleaving scheduler 40 which can at each moment be chosen by the scheduler for execution. Such a submachine call can be described as follows:

```
VIRTUALPROVIDER=
    let M=Select({RECEIVEREQ,SENDANSW} ∪
        {PROCESS,SENDREQ,RECEIVEANSW}) in
    M
``` where Select is the scheduling function performed by the scheduler 40.

The first receiving machine 11 can now receive request messages from the client 20 which are elements of a set mathematically called InRegMssg. Those received requests can then be handled by the processing machine 13, typically by sending to the providers 30 request messages for a series of subrequests which are needed to service the currently handled received requests. The second sending machine 14 sends outgoing request messages to one or more of the providers 30 which may again be virtual providers. The providers 30 can then send back an answer, respectively, with respect to the outgoing request messages, an answer which can be received by the second receiving machine 15 which is configured to receive incoming answer messages from the providers 30. The received answers from the providers 30 can then be further processed by the processing machine 13. Finally, a final answer can be sent back to the client 20 by the first sending machine 12 as response to an initial request message of the client 20. The final answer is composed and elaborated with respect to the incoming answer messages from the providers 30.

Figure 2:
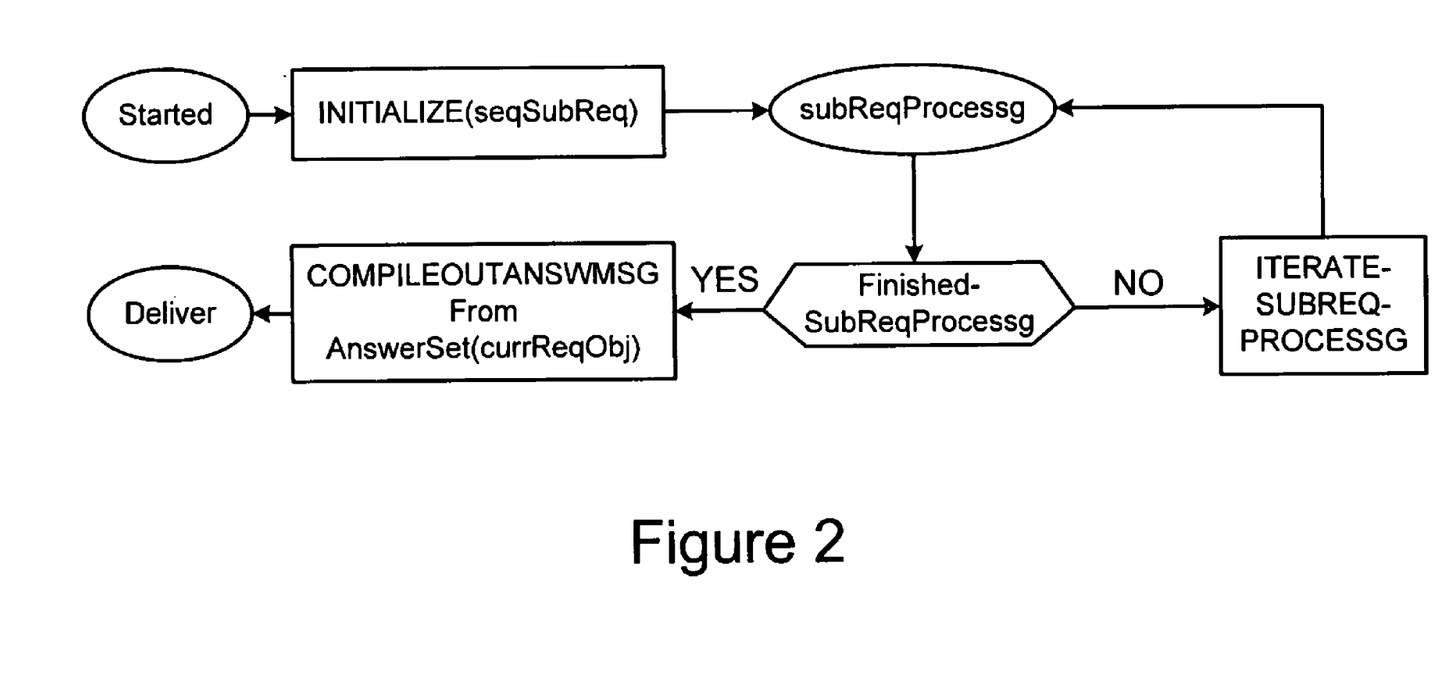
FIG. 2 shows a schematic diagram of an embodiment of processing steps of a method for mediating within a network.

FIG. 2 shows an example of an operation modus of a processing machine as part of a mediator system. The processing machine can be realized, for example, by an abstract state machine. Signature and transition rules of the abstract state machine called PROCESS for the processing kernel of a mediator system may be defined. The signature definition really provides a schema which is to be instantiated for each particular processing kernel of a concrete mediator system, namely by giving concrete definitions for the abstract functions which will be introduced.

In the following, a scheduler which calls the abstract state machine PROCESS for a particular current request object currReqObj is abstracted. The machine PROCESS is described, therefore, as parameterized by such a current request object currReqObj which plays the role of a global instance variable. The definition is given in terms of control state abstract state machines in FIG. 2 using a standard graphical representation of finite automata or flowcharts as graphs with circles for internal states, here to be interpreted as a current value of the status of the current request object status(currReqObj) within the mediator system, rhombs for test predicates and rectangles for actions of the processing machine PROCESS. As soon as a request object has reached the status "started" a processing call for such a started request object currReqObj triggers to initialize an iterative sequential subrequest processing (INITIALIZE(seqSubReq)), namely of immediate subrequests of this current request object currReqObj, in the order defined by an iterator over a set of sequential subrequests described as SeqSubReq(currReqObj). This means that each incoming request object currReqObj triggers the sequential elaboration of a finite number of immediate subrequests, which are members of the set of sequential subrequests SeqSubReq(currReqObj) called for short sequential subrequests. It is possible that each of such sequential subrequests can trigger a finite number of further subsubrequests, which are sent to external providers where they are elaborated independently of each other, so that they can be regarded as parallel subrequests of the sequential subrequests. The processing machine PROCESS can use for an elaboration of the sequential subrequests of a current request object currReqObj a submachine called ITERATESUBREQPROCESSG. Once the processing machine PROCESS has finished the subrequest processing (FinishedSubReqProcessg), it compiles from the current request object currReqObj an answer, called outAnswer(currReqObj) of the current request object by taking into account a set described as AnswerSet(currReqObj), and transforms the internal answer information into an element of OutAnswMssg using an abstract function (outAnsw2Mssg). This answer compilation is guarded by a previous check whether AnswToBeSent for the current request object currReqObj evaluates to true.

In the following a textual definition of the processing machine PROCESS as it is described by FIG. 2 is also given. A function initStatus is used which yields for a control state abstract state machine its initial control status. This function is hidden in the graphical representation. A function seqSubReq(currReqObj) denotes a current item of the iterator submachine ITERATESUBREQPROCESSG:

```
PROCESS(currReqObj)=
    if status(currReqObj)= started then
        INITIALIZE(seqSubReq(currReqObj))
        status(currReqObj):= subReqProcessg
    if status(currReqObj)= subReqProcessg then
        if FinishedSubReqProcessg then
            COMPILEOUTANSWMSG from currReqObj
            status(currReqObj):= deliver
        else
            StartNexRound(ITERATESUBREQPROCESSG)
        where
    COMPILEOUTANSWMSG from currRegObj =
        if AnswToBeSent(currReqObj) then
            SentAnswToMailer(outAnw2Mssg(outAnswer(currReqObj)))=true
    StartNexRound(M)=
        status(currReqObj):=initStatus(M)
```

Figure 3:
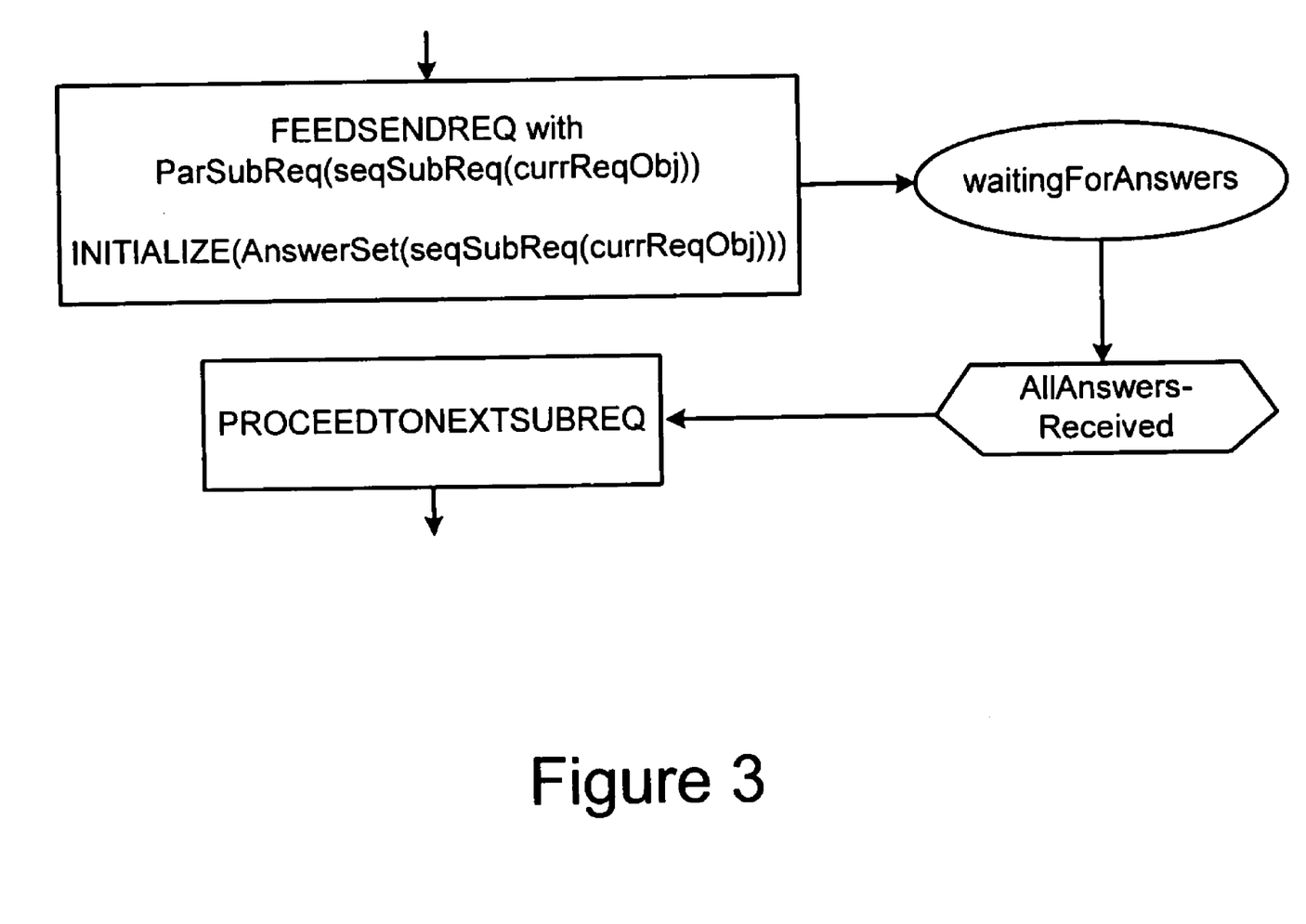
FIG. 3 shows a partial flow chart of another embodiment of a method for mediating within a network, including a subrequest processing iteration.

FIG. 3 shows a partial flowchart of a processing of a received request message. An already described processing machine PROCESS can contain a submachine which allows to iterate processing of subrequests as many times as required. As already previously described a request message is typically split up in several subrequests. Those subrequests can further be decomposed in subsubrequests. Furthermore, processing of one or more subrequests can depend on a terminated processing of one or more subrequests. It is possible that a certain subrequest can only be processed by taking into account one or more answers given for a previous subrequest. One single subrequest can be decomposed, as already mentioned, in several subsubrequests. Those subsubrequests can be processed by sending out appropriate request messages to one or more external providers. The processing of a subrequest is controlled by the submachine ITERATESUBREQPROCESSG which operates according to a flowchart illustrated in FIG. 3. The submachine ITERATESUBREQPROCESSG is an iterator machine and part of the machine PROCESS. For every current sequential subrequest, in the following called seqSubReq, the submachine starts to feed a second sending machine of the mediator system, called FEEDSENDREQ with a request message to be sent out for every immediate subsubrequest of the current seqSubReq. The second sending machine is first fed with all subsubrequests of the sequential subrequest which can be sent out in parallel (ParSubReq(seqSubReq(currReqObj))). Therefore, an outgoing request message is prepared by the processing machine PROCESS and sent to a second sending machine SEND, which can be described by setting a mailbox predicate called SentReqToMailer as a function of this prepared outgoing request message, called outReq2Mssg to true. The outgoing request message is transformed into a format which is compatible with the format used by a corresponding provider to which the outgoing request message is sent. The immediate subsubrequests of the seqSubReq can be regarded as elements of a set of parallel subrequests of the given sequential subrequest. Those immediate subsubrequests are assumed to be processable by other providers independently of each other. Therefore, the submachine elaborates simultaneously for each sequential subrequest an outgoing request message, called outReqMsg. Simultaneously the submachine also initializes an answer set of the specific sequential subrequest, described as AnswerSet(seqSubReq). After having initialized the answer set, the submachine assumes a status value in which it is waiting for answers, the status called waitingForAnswers. The submachine remains within the status until all expected answers from the corresponding providers are received, which can be described by a predicate AllAnswersReceived. When all expected answers have been received, the submachine can proceed to process the next subrequests, a step which is declared in FIG. 3 as PROCEEDTONEXTSUBREQ. As long as the submachine is still waiting for answers, the second receiving machine, called RECEIVEANSW inserts for every received answer an internal answer representation into the answer set for the sequential subrequest, called AnswerSet(seqSubReq) of the currently processed sequential subrequest seqSubReq, which is supposed to be retrievable as requestor of the incoming answer message which is sent by a specific provider. For the sake of illustration, a textual version for a definition of the submachine described in FIG. 3 is given in the following:

```
ITERATESUBREQPROCESSG =
   if status(currReqObj) = initStatus(ITERATESUBREQPROCESSG) then
      FEEDSENDREQ with ParSubReq(seqSubReq(currReqObj))
      INITIALIZE(AnswerSet(seqSubReq(currReqObj)))
      status(currReqObj):=waitingForAnswers
   if status(currReqObj) = waitingForAnswers then
      if AllAnswersReceived then
         PROCEEDTONEXTSUBREQ
         status(currReqObj):=subReqProcessg
where
   FEEDSENDREQ with ParSubReq(seqSubReq) =
      forall s ∈ ParSubReq(seqSubReq)
         SentReqToMailer(outReq2Mssg(s)):= true
```

Furthermore, all remaining macros used in FIG. 3 are defined in the following, though their intended meaning can be derived from the chosen names. The following three definitions concern an iterator pattern defined by seqSubReq, denoting the current item in the underlying set SeqSubReq ∪ {Done(SeqSubReq(currReqObj))}, two functions FstSubReq and NxtSubReq, the latter defined on the sets SeqSubReq of sequential subrequests and on AnswerSets, the stop element Done(SeqSubReq(currReqObj)), which is constrained by the condition that it is not an element of any set SeqSubReq.

```
INITIALIZE(seqSubReq) =
   let r = FstSubReq(SeqSubReq(currReqObj))
      seqSubReq:=r
      ParSubReq(r):= FstParReq(r,currReqObj)
```

-continued

```
FinishedSubReqProcessg =
   seqSubReq(currReqObj) = Done(SeqSubReq(currReqObj))
PROCEEDTONEXTSUBREQ =
   let s = NxtSubReq(SeqSubReq(currReqObj), seqSubReq(currReqObj),
         AnswerSet(currReqObj))
      seqSubReq(currReqObj):= s
      ParSubReq(s):= NxtParReq(s,currReqObj)
```

The described iterator pattern foresees the possibility that a next subrequest and generation of parallel requests are determined in terms of answers which are accumulated so far for an overall request object, i.e. taking into account answers which are obtained for preceding sequential subrequests.

A generation for an answer set concerning a sequential subrequest of a current request object can be described as follows:

```
INITIALIZE(AnswerSet(seqSubReq))=
   AnswerSet(seqSubReq):= ∅
AllAnswersReceived =
   let seqSubReq = seqSubReq(currReqObj)
      for each req ∈ ToBeAnswered(ParSubReq(seqSubReq))
         there is some answ ∈ AnswerSet(seqSubReq)
```

The definition foresees a possibility that some of the parallel subrequest messages which are sent out to providers may not necessitate an answer for the mediator system, therefore a function called ToBeAnswered filters them out from the condition described as waitingForAnswers to leave the current iteration round. The answer set of any main request object can be defined as a derived function of the answer sets of its sequential subrequests, which can be described as follows:

AnswerSet(reqObj)=Combine({AnswerSet(s)|s∈SeqSubReq(regObj)})

Figure 4:
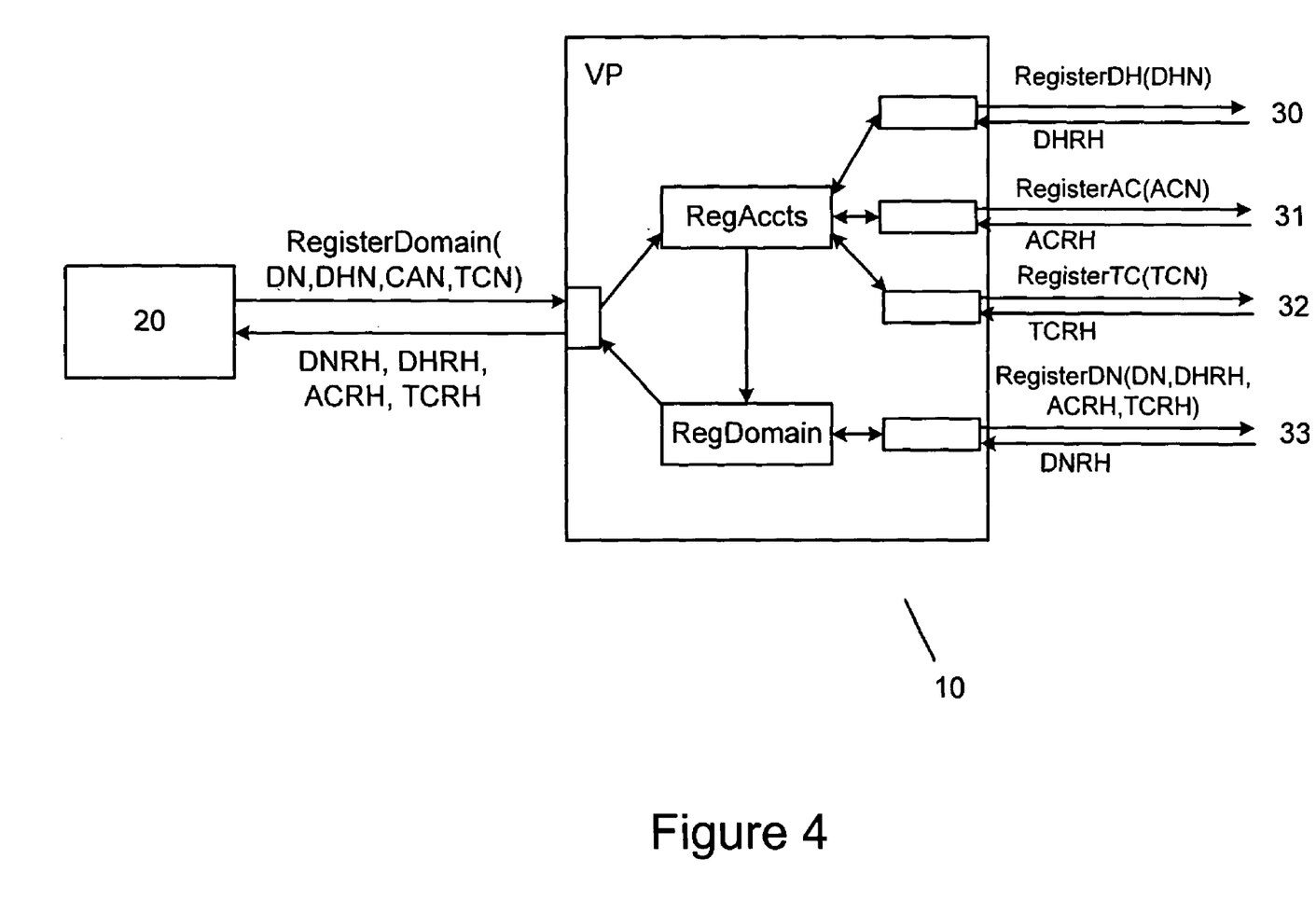
FIG. 4 shows a schematic diagram of a further embodiment of a system for mediating within a network.

FIG. 4 explains and describes the concrete example for an application of an embodiment of a mediator system. FIG. 4 shows a mediator system 10. Furthermore, a client 20 is shown and four providers 30, 31, 32 and 33. The client 20 requests a domain name registration. Client 20 wants to handle such a domain name registration in a unified manner using a fixed interface. This interface should contain within the described example only one request message. This request message, called RegisterDomain, requires four input parameters, namely a domain name DN, which describes the name of the new domain that should be registered, a domain holder name DHN, which corresponds to the name of the person that will in a legal sense be the owner of the domain, an administrative contact name ACN, which corresponds to the name of the person that will administer the domain, and a technical contact name TCN, which is a name of the person that will be responsible for technical issues. On a successful registration, an answer to such a request has to contain four so-called RIPE-Handles. Those RIPE-Handles uniquely identifying the four names are provided in the request message in the RIPE (Réseaux IP Européens) database for future reference. In the given example it is assumed that the client 20 is extending its business into an area whose domain name registry authority implements a different interface for registering new domain names. This interface includes four request messages, namely RegisterDH (DomainHolderName), RegisterAC (AdministrativeContactName), RegisterTC (TechnicalContactName), and RegisterDN (DomainName, DO-RIPE-Handle, AC-RIPE-Handle, TC-RIPE-Handle).

The mediator system is now interposed between the client 20 and the four providers 30 to 33 which can serve the request of the client 20. Within the mediator system 10 the incoming request called RegisterDomain, of client 20 is split up into a sequence of two subrequests, namely in a subrequest concerning register accounts (RegAccts) and in a subrequest concerning register domain (RegDomain). The first subrequest is further divided into three parallel subrequests, each registering one of the mentioned respective contacts. The detailed course of action is ruled by a system specific scheme and controlled by the defined and callable logical machines of the concrete mediator system as abstractly described in connection with FIGS. 1, 2 and 3. The subrequest RegisterDH concerning the name of the domain holder is sent to provider 30, the subrequest RegisterAC concerning the registering of the name of the administrative contact is sent to provider 31, and the subrequest RegisterTC concerning the registering of the name of the technical contact is sent to provider 32. Provider 30 answers by sending back a RIPE-Handle with a domain holder name, described as DHRH. Provider 31 answers by sending back a RIPE-Handle with the name of an administrative contact, called ACRH. Provider 32 finally answers by a RIPE-Handle with the name of a technical contact, described as TCRH. Once all answers for these parallel subrequests have been received by the mediator system 10, the second sequential subrequest can be performed, whose outgoing request message is constructed from the answers of the previous subrequests and the parameter concerning the domain name from the incoming request. Therefore, this subrequest calls RegisterDN(DN, DHRH, ACRH, TCRH). This subrequest is sent to provider 33, which answers by sending back a RIPE-Handle with a domain name, called DNRH.

Using a notation convention of appending Obj when referring to an internal representation of the different requests, the mediator system 10 can be described as follows:

```
INITIALIZE(RegisterDomainObj,RegisterDomain(DN,DHN,ACN,TCN)=
    params(RegisterDomainObj):={DN,DHN,ACN,TCN}
    SeqSubReq(RegisterDomainObj):=(RegAccnts,RegDomain}
    FstSubReq({RegAccnts,RegDomain}):=RegAccnts
    NxtSubReq({RegAccnts,RegDomain},RegAccnts,-):=RegDomain
    NxtSubReq({RegAccnts,RegDomain},RegDomain,-):=nil
    FstParReq(RegAccnts,RegisterDomainObj):=
        {RegisterDH(DHN),RegisterAC(ACN),
        RegisterTC(TCN)}
NxtParReq(RegDomain,RegisterDomainObj,AS):=
        (RegisterDN(DN,handle(DHRHObj),
        handle(ACRHObj),handle(TCRHObj)}
    AnswToBeSent(RegisterDomainObj):=true
    ToBeAnswered({RegisterDH,RegisterAC,RegisterTC}):=
        {RegisterDH, RegisterAC,RegisterTC}
    ToBeAnswered({RegisterDN}):={RegisterDN}
    status(RegisterDomainObj):=started
where
    AS = {DHRHObj,ACRHObj,TCRHObj}
```

$$handle(X) \begin{cases} DHRH & if\ X = DHRHObj \\ DNRH & if\ X = DHRHObj \\ ACRH & if\ X = ACRHObj \\ TCRH & if\ X = TCRHObj \end{cases}$$

The derived function Combine simply computes the union of the two answer sets:

Combine(RegisterDomainObj)=AnswerSet(RegAccnts)∪AnswerSet(RegDomain)

Next, the answer function that maps an incoming message to their internal representation is here defined as follows:

$$answer(inAnswMsg) = \begin{cases} DHRHObj & if\ inAnswMsg = DHRH \\ DNRHObj & if\ inAnswMsg = DNRH \\ ACRHObj & if\ inAnswMsg = ACRH \\ TCRHObj & if\ inAnswMsg = TCRH \end{cases}$$

Finally, a definition of outAnsw2Msg can be:

outAnsw2Msg({DHRHObj,DNRHObj,ACRHObj,
    TCRHObj})=Formatted({DNRH,DHRH,ACRH,
    TCRH})

A function called Formatted is used to transform parameters into a format which is expected by the requester, namely the client 20. The function is left abstract within the example since it depends on an actual implementation.

After a new register domain request message from the client 20 arrives, a scheduler, not shown in the example, can invoke the first receiving machine RECEIVEREQ. Since the request message is new, a new internal representation of that message will be created via a call to a submachine which is responsible for creation of a new request object, called CREATENEWREQOBJ. This will eventually lead to a call of the above described INITIALIZE machine. The status of the new request message called RegisterDomainObj will change into "started", which turns it into a candidate for further processing. When the scheduler calls the processing machine PROCESS of the mediator system 10 for that request message object, the first rule INITIALIZE(seqSubReq) will fire, as a result of which the current sequential subrequest seqSubReq will point to ReqAccnts, the first subrequest in the sequence. Furthermore, the request status will be updated to subReqProcessing. In the next call to the processing machine PROCESS for RegisterDomainObj, the second rule will be executed since the machine is still in the subReqProcessing state. But since there is still something to do the machine starts the next round by calling the ITERATESUBREQPROCESSG submachine. Within that step, the status of the current RegisterDomainObj will be set to the initial state of the iterator machine. This iterator machine that has been idle until now will now proceed to sending out all parallel subrequests of RegAccnts and updating the request message object status to waitingForAnswers. This means that it now will "spin lock" until all three expected answers for the subrequests RegAccnts have been received. These answers will be fed into an answer set via the second receiving machine called RECEIVEANSW which is responsible to receive answers coming in from the called providers. Once all three answers have been received, the iterator machine will proceed to the next subrequest, i.e. it will update the seqSubReq to RegDomain and the request message object status to subReqProcessing. By that, it will bring itself back to an idle state. Now the whole subrequest processing will happen for the second subrequest, namely RegDomain. Once the iterator machine has received the one expected answer, the seqSubReq will then be updated to nil. This will in turn make a predicate called FinishedSubReqProcessing evaluate to true, so the processing machine PROCESS will now compile an outgoing answer message. Since an answer is expected, an outgoing answer message is produced using a function outAnsw2Msg which is defined above and handed over to a mailer component for delivery. At the same time, the status of the request message object will be updated to deliver, signaling the scheduler that the answer message can indeed be delivered to the client 20.

In the following a signature definition and rules for a mediator system as described herein is given:

```
Signature
RECEIVEREQ, RECEIVEANSW signature
InReqMssg set of incoming request messages sent by a requestor
ReceivedReq:InReqMssg → BOOL
INITIALIZE(r,m) submaschine for abstract data extraction
    r ∈ ReqObj internal representation of m ∈ InReqMssg
NewRequest:InReqMssg → BOOL
REFRESHREQOBJ(r,inReqMsg) submachine to update state of r by new data arriving through
inReqMsg
    prevReqObj(inReqMsg) the existing request object to which the new inReqMsg belongs
    InAnswMssg set of incoming answer messages sent by a provider
    ReceivedAnsw:InAnswMssg → BOOL
    insert for insertion of answers
    shared with PROCESS
        ReqObj set of current request objects
(IDs of international representation of data extracted from received request messages)
        status:ReqObj→{initStatus(PROCESS),started,subReqProcessg,
        deliver}
            ∪ {initStatus(ITERATESUBREQPROCESSG),waitingforAnswers}
        requestor:InAnswMssg → SeqSubReq
        answer(inAnswMsg)
 internal representation of the answer extracted from an incoming answer message
            AnswerSet(seqSubReq) answer set constructed for a sequential subrequest
    SENDANSW, SENDREQ signature
    OutAnswMssg set of outgoing answer messages compiled by PROCESS
    SentAnswToMailer:OutAnswMssg → BOOL
    OutReqMssg set of outgoing request messages prepared by PROCESS
    SentReqToMailer:OutReqMssg → BOOL
    SEND abstract machine sending messages to destinators
PROCESS signature
    currReqObj:ReqObj distinguished element denoting currently processed request object
    SeqSubReq set of any sequential subrequest
    SeqSubReq(regObj) ⊂ SeqSubReq
        set of sequential subrequests of a given request object
    SeqSubReq Iterator Functions
        seqSubReq(currReqObj):SeqSubReq(currReqObj)∪
        {Done(SeqSubReq(currReqObj))}
            distinguished element denoting the currently processed sequential subrequest
        Done(SeqSubReq(currReqObj)) distinguished termination element, not
            element of SeqSubReq
        FstSubReq(SeqSubReq(reqObj)):SeqSubReq(regOjb)∪
        {Done(SeqSubReq(currReqObj))}
            yields the first sequential subrequest element, for any regObj
        NxtSubReq(SeqSubReq(reqObj),seqSubReq(reqObj),AnswerSet(reqObj)):
            SeqSubReq(reqObj) ∪ {Done(SeqSubReq(currReqObj))}
    StartNextRound(M)=
        status(currReqObj):=initStatus(M)
    outReq2Mssg(s) ∈ OutReqMssg for s ∈ ParSubReq
    ParSubReq set of any parallel subrequest
    ParSubReq(seqSubReq) ⊂ ParSubReq
        set of parallel subrequests of a given sequential subrequest
    ToBeAnswered(ParSubReq(seqSubReq)) ⊂ ParSubReq(seqSubReq)
            implementation defined operator filtering out to be answered parallel subrequests
    FstParReq(seqSubReq(currReqObj),currReqObj):ParSubReq(seqSubReq(currReqObj))
    NxtParReq(seqSubReq(currReqObj),currReqObj):ParSubReq(seqSubReq
    (currRegObj))
        generates parallel subrequests for a given sequential subrequest
    outAnsw2Mssg(outAnswer(reqObj)) ∈ OutAnswMssg
    outAnswer:ReqObj → OutAnswer
Derived locations and submachines
FinishedSubReqProcessg =
    seqSubReq(currReqObj) = Done(SeqSubReq(currReqObj))
AnswerSet(reqObj) =
    Combine({AnswerSet(s) | s ∈ SeqSubReq(reqObj)})
AllAnswersReceived =
    for each req ∈ ToBeAnswered(ParSubReq(seqSubReq(currReqObj)))
        there is some answ ∈ AnswerSet(seqSubReq)
INITIALIZE(seqSubReq) =
    let r = FstSubReq(SeqSubReq(currReqObj))
        seqSubReq:=r
        ParSubReq(r):=FstParReq(r,currReqObj)
INITIALIZE(AnswerSet(seqSubReq)) =
    AnswerSet(seqSubReq):=∅
PROCEEDTONEXTSUBREQ =
    let s = NxtSubReq(SeqSubReq(currReqObj),seqSubReq(currReqObj),
        AnswerSet(currReqObj))
        seqSubReq(currReqObj):= s
```

```
        ParSubReq(s):= NxtParReq(s, currReqObj)
Rules
MODULE VIRTUALPROVIDER =
    REICEVEREQ
    SENDANSW
    PROCESS
    SENDREQ
    RECEIVEANSW
RECEIVEREQ(inReqMsg,ReqObj) =
    if ReceivedReq(inReqMsg) then
        if NewRequest(inReqMsg) then
            CREATENEWREQOBJ(inReqMsg,ReqObj)
        else let r=prevReq(inReqMsg) in
            REFRESHREQOBJ (r,inReqMsg)
where
CREATENEWREQOBJ(m,R) =
    let r = New(R)^10 in
        INITIALIZE(r,m)
SENDANSW(outAnswerMsg,SentAnswToMailer) =
    if SentAnswToMailer(outAnswerMsg) then SEND(outAnswMsg)
SENDREQ(outReqMsg,SentReqToMailer) =
    if SentReqToMailer(outReqMsg) then SEND(outReqMsg)
RECEIVEANSW(inAnswMsg,AnswerSet) =
    if ReceivedAnsw(inAnswMsg) then
        insert answer(inAnswMsg) into AnswerSet(requestor(inAnswMsg))
PROCESS(currReqObj) =
    if status(currReqObj) = started then
        INITIALIZE(seqSubReq(currReqObj))
        status(currReqObj):=subReqProcessg
    if status(currReqObj)=subReqProcessg then
    if FinishedSubReqProcessg then
        COMPILEOUTANSWMSG from currReqObj
        status(currReqObj):=deliver
    else
        StartNextRound(ITERATESUBREQPROCESSG)
where
COMPILEOUTANSWMSG from currReqObj =
    if AnswToBeSent(currReqObj) then
        SentAnswToMailer(outAnsw2Mssg(outAnswer(currReqObj))):=true
    StartNexRound(M)=
        status(currReqObj):=initStatus(M)
ITERATESUBREQPROCESSG =
    if status(currReqObj) = initStatus(ITERATESUBREQPROCESSG) then
        FEEDSENDREQ with ParSubReq(seqSubReq(currReqObj))
        INITIALIZE(AnswerSet(seqSubReq(currReqObj)))
        status(currReqObj):=waitingForAnswers
    if status(currReqObj)=waitingForAnswers then
        if AllAnswersReceived then
            PROCEEDTONEXTSUBREQ
            status(currReqObj):=subReqProcessg
where
    FEEDSENDREQ with ParSubReq(seqSubReq) =
        forall s ∈ ParSubReq(seqSubReq)
            SentReqToMailer(outReq2Mssg(s)):=true
```

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A mediator system including comprising:
   instructions recorded on a non-transitory computer-readable storage medium and executable by at least one processor, the system for mediating a communication between a client and a plurality of providers within a network, wherein the client provides at least one request message, the mediator system comprising including the following predefined and callable logical machines:
   a first receiving machine configured to receive the request message from the client using a client interface and to create therefrom a request object;
   a first sending machine configured to send answer messages back to the client using the client interface;
   a processing machine configured to handle the received request message internally represented as the request object;
   a second sending machine configured to send outgoing request messages to the providers using corresponding provider-specific interfaces; and
   a second receiving machine configured to receive incoming answer messages from the providers via the corresponding provider-specific interfaces,
   wherein the machines are configured for being scheduled separately from being executed, and wherein the processing machine is configured to split the request object, based on message exchange compatibility with the provider interfaces, into a sequence of subrequests and to decompose each subrequest of the sequence of subrequests into a set of subsubrequests, and to execute message exchanges with the providers including
   determining a subrequest of the sequence,
   associating a number of subsubrequests in the determined subrequest with a corresponding subset of the providers,
   sending out the number of subsubrequests in parallel to the corresponding subset of providers using corresponding provider interfaces, and
   executing a following subrequest of the sequence of subrequests.

2. The mediator system according to claim 1, wherein the mediator system comprises a recording machine configured to record information about or related to the received request message which can be recognized and retrieved at a later stage.

3. The mediator system according to claim 1, wherein the mediator system comprises a scheduler which can call and therewith activate one of the machines which is ready to execute.

4. The mediator system according to claim 3, wherein the scheduler is configured to dynamically schedule an execution order of the machines when a plurality of request messages is provided.

5. The mediator system according to claim 3, wherein the scheduler includes an interleaving scheduler which is configured to non-deterministically call and therewith activate one of the machines which is ready to execute.

6. The mediator system according to claim 1, wherein the first receiving machine is configured to create from the request message, for further internal handling, the request object which is appropriately initialised by recording in an internal representation a request identity and request relevant parameters.

7. The mediator system according to claim 6, wherein the request object is decorated with several information variables, including a status variable which are automatically updated during execution of the machines.

8. The mediator system according to claim 7, wherein the predefined and callable machines are activated depending on settings of the status variable.

9. The mediator system according to claim 1, wherein the first and second receiving machines are realized by and implemented as one receiving machine and/or the first and second sending machines are realized by and implemented as one sending machine.

10. The mediator system according to claim 1, wherein the client handles the at least one request message in a unified manner via a fixed interface.

11. The mediator system according to claim 1, wherein at least a part of the subrequests can be at least partially serviced internally by the processing machine, thus the processing machine acting as a provider itself.

12. The mediator system according to claim 1, wherein the subsubrequests are each be sent to and processed by different providers independently of each other.

13. The mediator system according to claim 1, wherein the processing machine comprises an iterator submachine which is configured to elaborate the sequential subrequests.

14. The mediator system according to claim 1, wherein an answer message to be sent back to the client is automatically compiled and transformed into a client compatible format.

15. The mediator system according to claim 1, wherein the mediator system includes a composition of a number of sub mediator systems which are appropriately connected with each other via corresponding interfaces.

16. The mediator system according to claim 1, wherein the processing machine is configured to prepare internally outgoing answer and/or outgoing request messages.

17. The mediator system according to claim 1, wherein the first and second sending machines are configured to do any sending and adapted to the communication medium used by the client and the providers, respectively.

18. A computer-implemented method for mediating a communication between a client and a plurality of providers within a network, wherein the client provides at least one request message with request relevant parameters, the method comprising:
receiving the request message from the client at a data processing apparatus, using a client interface;
creating from the request message a request object;
splitting the request object into a sequence of subrequests with respect to the request relevant parameters, wherein each subrequest of the sequence of subrequests is associated with a corresponding subset of the providers;
splitting each subrequest of the sequence into a set of subsubrequests, wherein the set of subsubrequests corresponds to the corresponding subset of the providers;
processing the request object with respect to the sequence of subrequests;
sending, from the data processing apparatus, request specific outgoing request messages with respect to each set of subsubrequests of each subrequest of the sequence of subrequests in parallel to the corresponding subset of the providers, using corresponding provider-specific interfaces;
receiving, at the data processing apparatus and for each set of subsubrequests of each subrequest of the sequence of subrequests, incoming answers with respect to the outgoing request messages from the corresponding subset of providers using the corresponding provider-specific interfaces; and
processing the incoming answer messages using the data processing apparatus,
wherein the splitting of the request object is based on message exchange compatibility with the provider-specific interfaces, and
wherein the method is performed by predefined and separately callable logical machines which are configured for being scheduled separately from being executed.

19. The method according to claim 18, wherein the receiving, creating, splitting, processing, and sending operations are dynamically scheduled and executed as many times as needed for completion of the sequence of subrequests.

20. The method according to claim 18, wherein information about or related to the received request message is recorded so that the stored information can be retrieved at a later stage if required.

21. The method according to claim 18, wherein a scheduler is provided which is configured to call and therewith activate one of the machines which is ready to execute.

22. The method according to claim 21, wherein the scheduler is configured to dynamically schedule an execution order of the machines when a plurality of request messages is provided.

23. The method according to claim 18, further comprising: creating from the request message of the client for further internal handling the request object which is appropriately initialised by recording in an internal representation a request identity and the request relevant parameters.

24. The method according to claim 23, wherein the request object is decorated with several information variables including a status variable.

25. The method according to claim 24, wherein the method is performed by predefined and separately callable logical machines are activated depending on settings of the status variable.

26. The method according to claim 18, further comprising sending an answer message back to the client using the client interfaces.

27. A computer program product for mediating a communication between a client and a plurality of providers within a network, the computer program product encoded on non-transitory computer-readable storage media, the computer program product being operable and executable by at least one data processing apparatus to cause the at least one data processing apparatus to:
receive a request message associated with request-relevant parameters from the client, using a client interface;
create from the request message a request object;
split the request object into a sequence of subrequests with respect to the request relevant parameters, wherein each subrequest of the sequence of subrequests is associated with a corresponding subset of the providers;
split each subrequest of the sequence into a set of subsubrequests, wherein the set of subsubrequests corresponds to the corresponding subset of the providers;
process the request object with respect to the sequence of subrequests;
send request-specific outgoing request messages with respect to each set of subsubrequests of each subrequest of the sequence of subrequests in parallel to corresponding subsets of the providers, using corresponding provider interfaces;
receive incoming answers with respect to the outgoing request messages from the corresponding subsets of the providers using the corresponding provider interfaces; and
process the incoming answer messages,
wherein the splitting of the request object is based on message exchange compatibility with the provider interfaces, and
wherein the instructions define separately callable logical machines which are configured for being scheduled separately from being executed.

28. The system of claim 1, wherein the client interface is associated with a first protocol for handling the request message and the corresponding provider-specific interfaces have corresponding protocols for handling the outgoing request messages and incoming answer messages, and wherein the processing machine is configured to reconcile incompatibilities between the first protocol and the corresponding protocols.

* * * * *